UNITED STATES PATENT OFFICE.

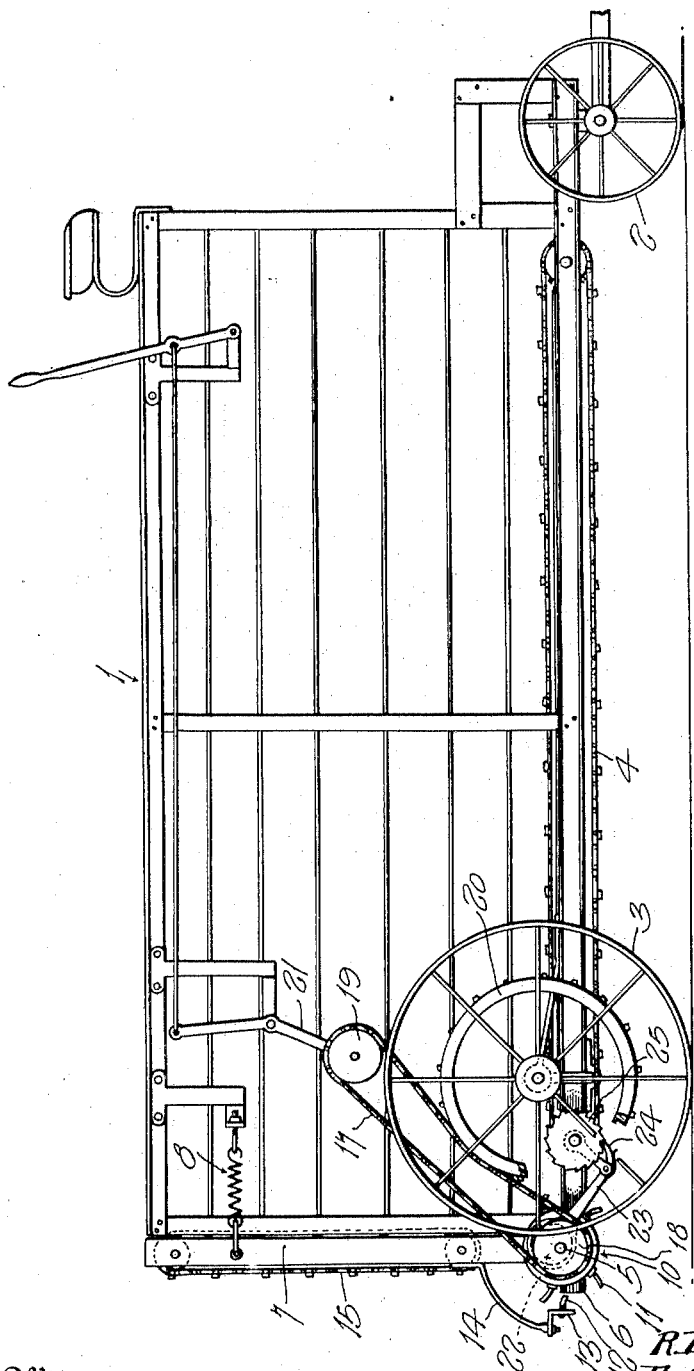

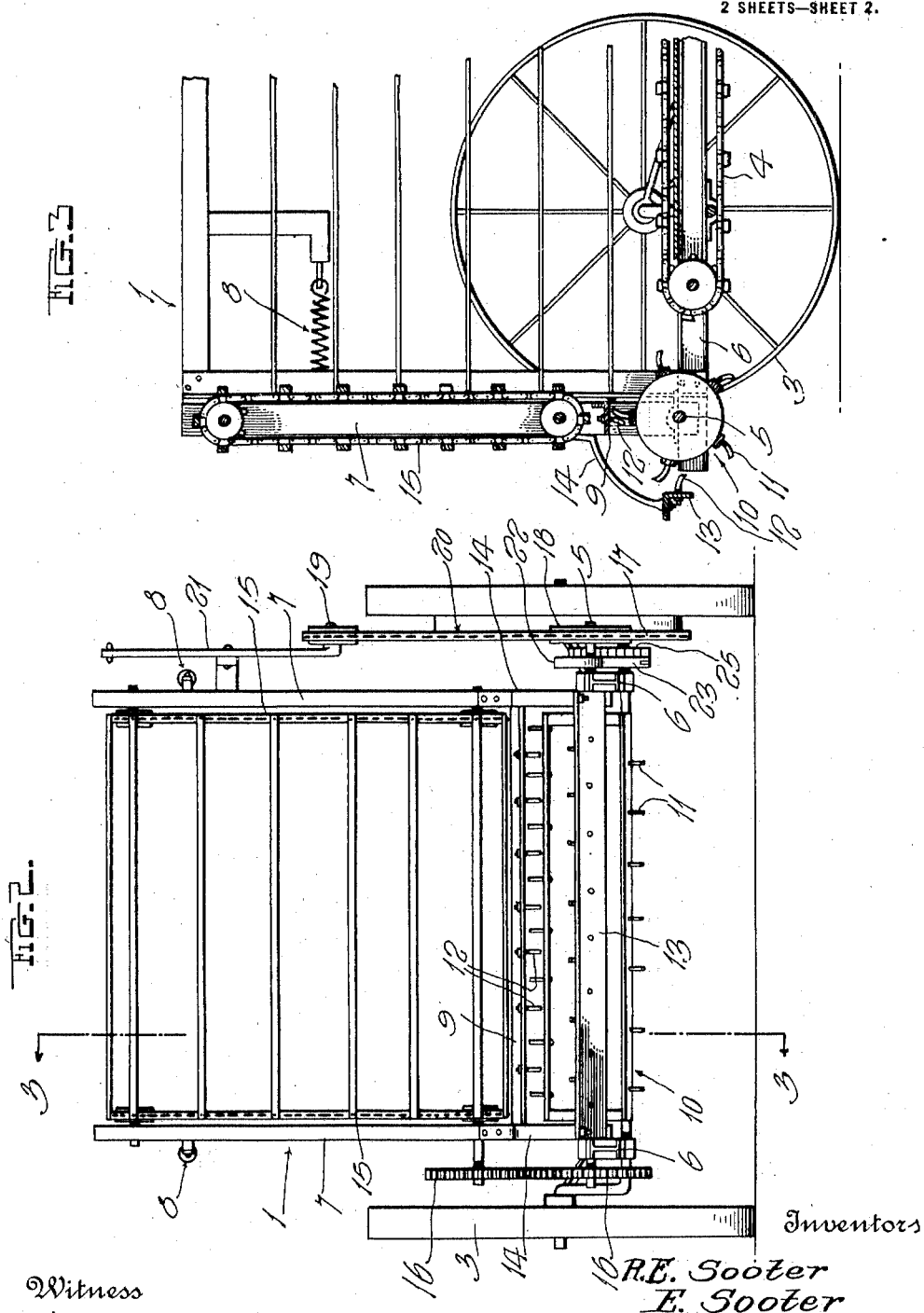

RAY EVAN SOOTER AND EARL SOOTER, OF COLDWATER, KANSAS.

STRAW-SPREADER.

1,258,370.

Specification of Letters Patent.

Patented Mar. 5, 1918.

Application filed May 21, 1917. Serial No. 169,999.

*To all whom it may concern:*

Be it known that we, RAY EVAN SOOTER and EARL SOOTER, citizens of the United States, residing at Coldwater, in the county of Comanche and State of Kansas, have invented certain new and useful Improvements in Straw-Spreaders; and we do declare the following to be a full, clear, and exact description of the invention, such as will enable others skilled in the art to which it appertains to make and use the same.

Our invention relates to that class of machines designed for spreading straw over areas to be fertilized or mulched thereby, the principal object being to simplify the construction of machines for this purpose, yet to provide one which will be highly efficient and durable.

In carrying out the above object, a rotary straw distributer is mounted at the rear end of a suitable portable rack and an endless belt conveyer, moving vertically, is provided for feeding the straw downwardly to said distributer as such straw is moved rearwardly by a feed apron at the bottom of the rack. Another object of the invention is to so mount the aforesaid conveyer as to permit it to yield rearwardly in case the straw should in any manner choke so that it does not properly distribute. Injury to the machine is thus prevented as the straw is fed rearwardly by the apron.

Yet another object of the invention is to provide an improved type of distributing means for spreading the straw.

With the foregoing general objects in view, the invention resides in the novel features of construction and unique combinations of parts hereinafter fully described and claimed, the descriptive matter being supplemented by the accompanying drawings which form a part of this specification, and in which:

Figure 1 is a side elevation of the improved machine with parts broken away and in section;

Fig. 2 is a rear elevation thereof; and

Fig. 3 is a vertical longitudinal section on the plane of the line 3—3 of Fig. 2.

In the drawings above briefly described, the numeral 1 has reference to a suitable straw rack preferably constructed of angle iron and rods although any other suitable formation could well be employed. The rack 1 is supported on front and rear wheels 2 and 3, which latter serve to drive the spreading mechanism as well as a feed apron 4 at the bottom of the rack for moving the straw rearwardly toward said spreading mechanism.

A transverse shaft 5 is rotatably mounted at the rear end of the base frame 6 of rack 1, and two vertically disposed bars 7 are pivotally mounted at their lower ends on said shaft, whereas their upper ends are connected by any suitable spring devices 8 with the rack 1 in such a manner as to permit said bars to yield rearwardly for a purpose to be described.

An angle iron bar 9 extends between and is secured to the lower end portions of the two bars 7 and coöperates with a transversely extending distributing drum 10, said drum having on its periphery a plurality of projecting teeth 11 similar to those used on the beaters of threshing machines. The teeth 11 pass between and coöperate with similar teeth 12 mounted on the bar 9 and on a second transverse angle iron bar 13 located in rear of the drum 10, the latter being mounted on the shaft 5. The several teeth thus serve to break up the straw rather finely and to distribute it upon the ground, the lowermost of the teeth 12 insuring that no straw shall accumulate on the drum. The bar 13 may be supported in any preferred manner, but it is by preference carried by the lower ends of a pair of hanger bars 14 whose upper ends are secured to the bars 7.

The straw is fed rearwardly to the distributing drum by the apron 4, and by means of an endless conveyer 15 mounted between the bars 7, said straw is also moved downwardly to prevent it from passing over the rear end of the rack. In case the outlet of the machine should choke from any cause, the rearwardly moving straw will force against the conveyer 15 and will thus rock the bars 7 rearwardly against the tension of the spring devices 8, thereby insuring that no injury shall be caused to the machine. As soon as the operator overcomes the difficulty and the machine again operates as intended the devices 8 will return the bars 7 and the conveyer 15 to their normal positions.

The lowermost shaft of the conveyer 15 is connected by gears 16 with the shaft 10 and for the purpose of driving the latter, a chain 17 passes around a sprocket 18 thereon and around another sprocket 19 carried by the rack 1, said chain meshing with a sprocket wheel 20 driven by one of the rear wheels 3. Sprocket 19 is preferably carried by the lower end of a lever 21 which may be moved so as to disengage said chain from the sprocket 20 to throw the machine out of gear, and although such an arrangement is not illustrated, it is possible that the lever 21 could be so connected with one of the bars 7 as to automatically throw the entire distributer and feeding mechanism out of gear the moment said bar is moved rearwardly by the crowding of straw against the conveyer 15.

The apron 4 may be driven in any of the well known ways, but an eccentric 22 on shaft 5 preferably reciprocates a link 23 to operate a pawl 24 which coacts with a ratchet wheel 25 on the rear shaft of said apron. This particular driving means is shown for illustrative purposes only and the construction thereof forms no part of my invention.

From the foregoing, taken in connection with the accompanying drawings, it will be obvious that although the machine is of simple and inexpensive nature, it will be highly efficient and will possess a number of advantageous characteristics. Since the particular construction shown is probably the most advantageous, it constitutes the preferred form of the spreader, but it is to be understood that within the scope of the invention as claimed, numerous changes may be made without sacrificing the principal advantages. Furthermore, we wish to state that although the machine is designed primarily for spreading straw, some types thereof could well be so constructed as to permit them to operate on heavier material.

We claim:

1. A spreader comprising a body to contain the material to be spread, a toothed distributing drum at the rear end of said body, means for moving the material in said body rearwardly toward said drum, a pair of vertically extending bars pivotally mounted at their lower ends upon the shaft of said drum, yielding means for maintaining said bars in a vertical position and permitting them to move rearwardly, a vertically moving conveyer mounted on said bars for feeding the material downwardly toward said drum, a transverse bar extending between the lower ends of said vertical bars and located immediately above said drum, and teeth depending from said transverse bar and coacting with the teeth of said drum.

2. A spreader comprising a body to contain the material to be spread, a toothed distributing drum at the rear end of said body, means for moving the material in said body rearwardly toward said drum, a pair of vertically extending bars pivotally mounted at their lower ends upon the shaft of said drum, yielding means for maintaining said bars in a vertical position and permitting them to move rearwardly, a vertically moving conveyer mounted on said bars for feeding the material downwardly toward said drum, a transverse bar extending between the lower ends of said vertical bars and located immediately above said drum, a second transverse bar fixedly mounted in rear of said drum, and teeth on both of said transverse bars for coöperation with the teeth of said frame.

3. A straw spreader comprising a portable body to contain the straw, an endless belt in the bottom of said body for feeding the straw rearwardly, a substantially vertical endless belt at the rear end of said body for feeding the straw downwardly, the two belts being spaced apart to form a straw outlet, a toothed rotary straw beater and spreader in said outlet, and a toothed bar coacting with said beater and spreader to disintegrate the straw.

In testimony whereof we have hereunto set our hands in the presence of two subscribing witnesses.

RAY EVAN SOOTER.
EARL SOOTER.

Witnesses:
A. C. LAMBE,
W. P. MARIS.